US008857528B2

(12) United States Patent
Lee

(10) Patent No.: US 8,857,528 B2
(45) Date of Patent: Oct. 14, 2014

(54) FLAME-BLOCKING SYSTEM AND CONSTRUCTION METHOD

(75) Inventor: Won Rock Lee, Jang-Ang Gu (KR)

(73) Assignee: 3M Innovative Properties Company, St. Paul, MN (US)

( * ) Notice: Subject to any disclaimer, the term of this patent is extended or adjusted under 35 U.S.C. 154(b) by 220 days.

(21) Appl. No.: 12/838,858

(22) Filed: Jul. 19, 2010

(65) Prior Publication Data

US 2011/0088917 A1    Apr. 21, 2011

(30) Foreign Application Priority Data

Jul. 20, 2009    (KR) .................. 10-2009-0065898

(51) Int. Cl.
| A24F 25/00 | (2006.01) |
| C09K 21/14 | (2006.01) |
| F16L 5/04 | (2006.01) |
| A62C 2/06 | (2006.01) |
| H02G 3/22 | (2006.01) |
| H02G 3/04 | (2006.01) |

(52) U.S. Cl.
CPC . *A62C 2/06* (2013.01); *C09K 21/14* (2013.01); *H02G 3/22* (2013.01); *F16L 5/04* (2013.01); *H02G 3/0412* (2013.01)
USPC ............................................. 169/48; 239/49

(58) Field of Classification Search
CPC .............. A62C 2/10; A62C 2/06; A62C 3/00; C09K 21/14; H02G 3/22; H02G 3/0412; F16L 5/04

USPC ...................................................... 169/48, 49
See application file for complete search history.

(56) References Cited

U.S. PATENT DOCUMENTS

| 4,424,867 A | * | 1/1984 | Mallow ........................... 169/43 |
| 5,155,957 A | * | 10/1992 | Robertson et al. ............... 52/232 |
| 5,452,551 A | * | 9/1995 | Charland et al. ................ 52/232 |
| 5,634,304 A | * | 6/1997 | Sakno ............................. 52/232 |

FOREIGN PATENT DOCUMENTS

| JP | 2003-154021 A | 5/2003 |
| JP | 2003-155484 | 5/2003 |
| JP | 2006-524736 | 11/2006 |
| KR | 2002-0034134 A | 5/2002 |
| KR | 10-0838822 B1 | 6/2008 |
| WO | WO 2004/096369 | 11/2004 |

OTHER PUBLICATIONS

International Search Report, PCT/US2010/042433, mailed Feb. 28, 2011, 3 pages.

* cited by examiner

*Primary Examiner* — Christopher Kim
(74) *Attorney, Agent, or Firm* — Dena M. Ehrich

(57) ABSTRACT

A flame-blocking system includes flame retardant foam having at least one through hole and at least one flame retardant tube passing through the through hole. Both the flame retardant foam and the flame retardant tube comprise graphite, aluminum hydroxide and ammonium phosphate in addition to a base resin. The flame-blocking system prevents flames and toxic gases generated during a fire or a similar accident from being spread through holes through which a wire, a cable or a pipe is installed across a wall of buildings or ships, which can reduce damage to life and property.

5 Claims, 2 Drawing Sheets

FLAME-BLOCKING SYSTEM AND CONSTRUCTION METHOD

BACKGROUND

This application claims priority from Korea Patent Application 10-2009-0065898, filed Jul. 20, 2009.

The present invention relates to a system for preventing flames and toxic gas from passing through a hole or opening in a partition or wall, such as an interior structure of a building, ship, or the like, upon occurrence of fire, and to a method of making such a system.

When fire occurs, serious damage to life and property may result. Regarding such damage, in addition to damage resulting directly from fire, loss of life caused by suffocation due to toxic gas generated from burning of flammable material and its rapid diffusion is a serious problem. Flames and toxic gas tend to pass through passages, such as doors, open holes, and cracks, of partition walls and interior structures of a building. Open holes in partition walls may be formed in partition walls of a building to pass wires, cables, or pipes through the partition walls. In particular, the interior of a ship has numerous pipes, wires, and cables, which are connected with one another. These pipes, wires, and cables are connected with one another by passing them through the open holes formed in the partition walls.

Conventionally, a volume space left in an open hole through which a cable or pipe already pass has remained empty or been filled with general filling foam or silicon sealants. As a result, there has been a problem because when fire occurs, the general material used to fill the empty space in the open hole easily burns or melts, and flames and toxic gas can easily pass through the open hole.

In addition, some conventional ships have used silica (glass fiber) as a material for filling a space in an open hole. Thus, there have been difficulties in constructing such ships due to skin irritation from glass dust, respiratory disorders, and dust generated during construction of the ships. And such ships are not environmentally friendly.

For an open hole through which a wire and a cable, etc., pass, the sheath of the wire and the cable, etc., may burn or fuse due to heat, thereby forming additional space in the open hole. In the circumstances, there has been a problem because if flames and gas are spreading, there is no system or device to stop the spread.

SUMMARY

The present invention provides a system that can effectively fix, support, and connect a cable, wire, pipe, or the like in an open hole formed in a partition wall, and a construction method thereof. In particular, by using the convenient and rapid construction method, the present invention can completely seal an empty space in an open hole.

In one aspect, the present invention provides a flame-blocking system and a construction method thereof, which are better for the environment and human body, by using the materials described herein, instead of silica (glass fiber), which is conventionally used as a filling material.

Unlike conventional systems for sealing an open hole, the present invention uses a combination system of flame retardant foam and a flame retardant tube. Thus, in another aspect, the present invention provides a flame-blocking system that can more closely seal an open hole formed in a partition wall by using the flame retardant foam and the flame retardant tube that swell due to an increase of temperature when fire occurs so as to completely block flame and toxic gas, and a construction method thereof.

In a particular embodiment, the present invention provides a flame-blocking system comprising flame retardant foam having at least one through hole, and at least one flame retardant tube passing through the through hole of the flame retardant foam.

In one aspect, the flame retardant foam comprises graphite, aluminum hydroxide, and ammonium phosphate, in addition to polyurethane base foam.

In another aspect, the flame retardant tube comprises graphite, aluminum hydroxide, and ammonium phosphate, in addition to a base resin made of EVA (ethylene vinyl acetate) or PVCA (poly vinyl chloride acetate).

In one aspect, if a temperature of more than 200° C. is maintained for three or more minutes, the flame retardant foam swells 150% to 300%, and the flame retardant tube swells 300% to 1500%.

In another aspect, the present invention provides a method of constructing the flame-blocking system. The method comprises preparing a flame retardant foam, cutting the flame retardant foam to a size suitable for an open hole formed in a wall to be installed, making a hole in the flame retardant filling foam to insert the flame retardant tube, and inserting at least one flame retardant tube into the hole.

As described above, the present invention can effectively fix, support, and connect a cable, a wire, and a pipe, which pass through an open hole of a partition wall in various buildings and ships.

In addition, because the present invention simultaneously uses the flame retardant foam and the flame retardant tube that swell at a high temperature upon occurrence of fire, it can effectively block flames and gases, thereby reducing damage to human life caused by suffocation or smoke inhalation.

Additionally, because the construction method is simple and does not require high facility and material costs, construction time and labor costs are reduced.

BRIEF DESCRIPTION OF THE DRAWINGS

The flame-blocking system and the construction method thereof according to the present invention will be described with reference to the accompanying drawings. The descriptions are merely exemplary in nature for understanding of the present invention and are not meant to limit the scope of the present invention to the exemplary embodiments.

DETAILED DESCRIPTION

Figure 1:
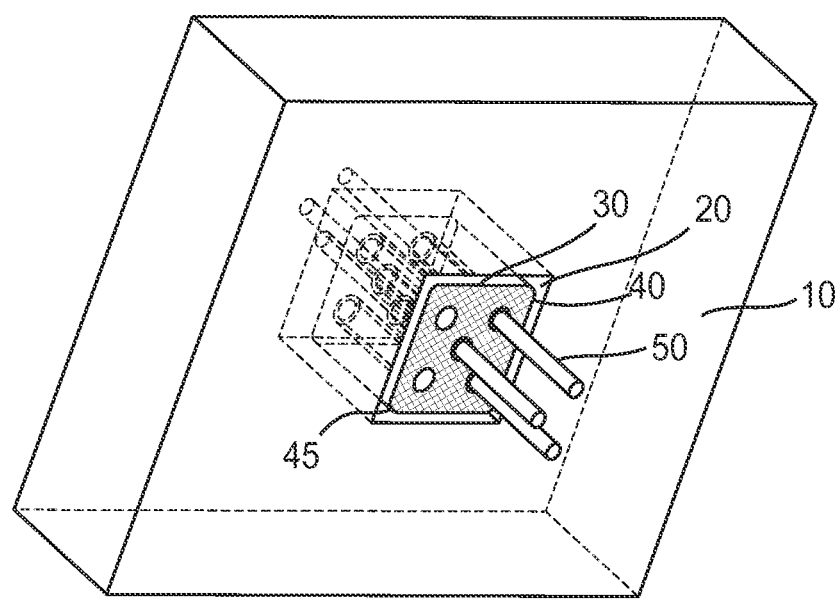
FIG. 1 is a perspective view showing the installment of the flame-blocking system according to an embodiment of the present invention.
Figure 2:
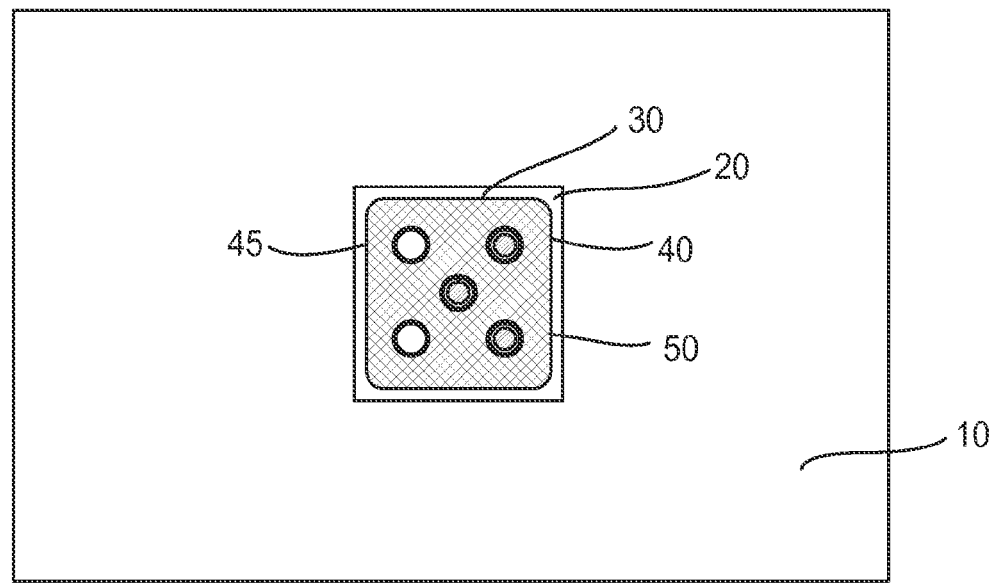
FIG. 2 shows a cross-sectional view of the flame-blocking system according to an embodiment of the present invention.
Figure 3:
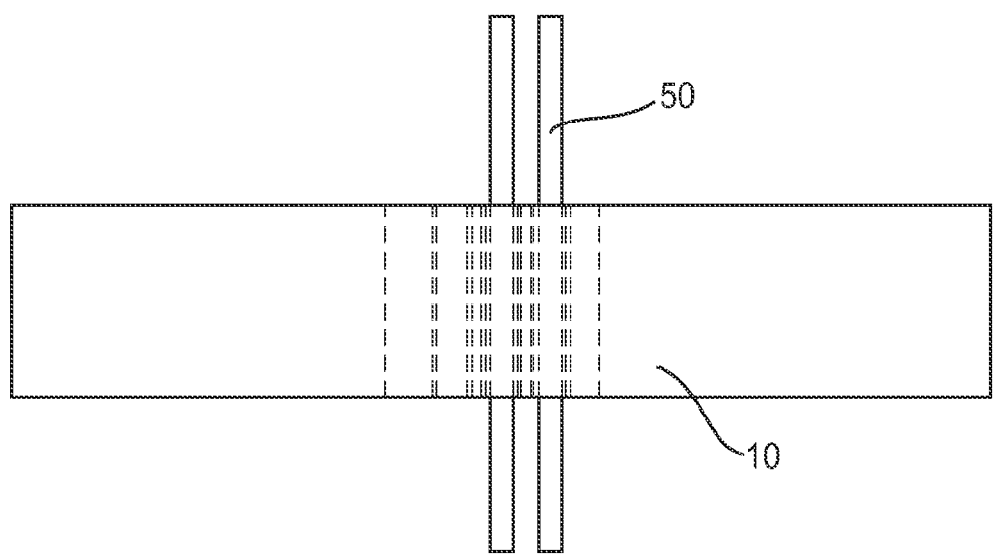
FIG. 3 is a top view of the flame-blocking system installed according to an embodiment of the present invention.

With reference to FIGS. 1 to 3, various cables, wires, and pipes, etc., pass through an open hole (20) formed in a partition wall of, for example, a building or ship. The flame-blocking system is installed in the open hole (20) and generally includes flame retardant foam (30) and a flame retardant tube (40).

In the state that the flame retardant foam (30) is cut to have a size suitable for the open hole (20) and fills the open hole (20), at least one flame retardant tube (40) is inserted into the flame retardant foam (30). Various cables, wires, and pipes, etc., (50) which are connected with one another through a partition wall (10) in a building, are positioned in the flame retardant tube (40). In other words, the flame retardant tube (40) encircles, surrounds or covers a portion of the cable, etc., and is inserted into the flame retardant foam (30).

The partition wall (10) may be, for example, a cement or brick partition wall for a general building, or a steel plate partition wall for an interior structure of a ship. Thus, the partition wall (10) of the present invention is not limited to particular materials. In addition, the open hole (20) defines a hole in the partition wall (10), through which various cables and wires, etc., pass. The hole may have diverse sizes and shapes according to features of a building.

The flame retardant foam (30) according to the present invention uses polyurethane foam having high elasticity and excellent physical properties as basic foam, and uses graphite, aluminum hydroxide, and ammonium phosphate as functional additives to enhance the fire stopping capability of the foam (30).

As to each of the functional additives, the graphite has a plate-shape structure. When the graphite encounters a temperature of more than 200° C., vapor is generated among lattices of the plate-shape structure. As a result, the plate-shape structure is pressed and swells. In addition, a carbon layer swelling upon occurrence of fire does not burn and remains so as to prevent the spread of heat. The aluminum hydroxide undergoes an endothermic reaction that absorbs heat when it is converted into an aluminum oxide. The ammonium phosphate used in the present invention rapidly absorbs oxygen so as to contribute to the carbonization of the graphite, etc.

With the properties of the functional additives, i.e., swelling, flame retardant property, and endothermic reaction, the flame retardant foam (30) expands or swells up to ten-fold when fire occurs (i.e. temperature increases). As a result of swelling, pressure is generated so that the open hole (20) can be more tightly sealed.

In one embodiment, the flame retardant foam (30) has the following composition and expansion properties:

| Composition of the flame retardant foam | Amount (part by weight) | |
| --- | --- | --- |
|  | Min | Max |
| Basic mixing ratio for synthesis of polyurethane | 100 | |
| Graphite | 20 | 75 |
| Aluminum hydroxide | 14 | 50 |
| Ammonium phosphate | 3 | 25 |
| Swelling rate (%) | 150 | 300 |

The flame retardant foam (30) may comprise 20 to 75 parts by weight of graphite, 14 to 50 parts by weight of aluminum hydroxide, and 3 to 25 parts by weight of ammonium phosphate, based on 100 parts by weight as a basic mixing ratio for synthesis of polyurethane (foam density: 100 to 150 kg/m3). The flame retardant foam (30) may expand from about 150% to about 300% when exposed to temperatures such as those encountered during a fire. The basic mixing ratio for synthesis of polyurethane is the mixing ratio that is essentially required to prepare polyurethane foam, i.e., 50 to 75 parts by weight of toluene diisocyanate, 2 to 5 parts by weight of water, 0.5 to 2.5 parts by weight of silicone surfactant, 0.1 to 1 parts by weight of an amine catalyst, 0.5 parts by weight of a tin catalyst, and 10 to 30 parts by weight of an additive, based on 100 parts by weight of polyol (halogenated polyether polyol). However, the present invention is not limited to this mixing ratio. The mixing ratio and the additives, etc., may be changed according to properties of the base urethane foam as is known in the art.

Although the embodiment described uses polyurethane foam as a base foam resin, it is merely one example. Other general foam resins, which can be prepared to expand to form foam by incorporating graphite, aluminum hydroxide, and ammonium phosphate in sufficient amounts used as functional additives or have elasticity in a foam form, may also be used.

The flame retardant tube (40) uses a base resin made of EVA (ethylene vinyl acetate) or PVCA (poly vinyl chloride acetate), and also uses graphite, aluminum hydroxide, and ammonium phosphate for swelling, flame retardant activity, and heat absorption.

In one embodiment, the flame retardant tube (40) has the following composition and expansion properties:

| Composition of the flame retardant tube | Amount (part by weight) | |
| --- | --- | --- |
|  | Min | Max |
| EVA (ethylene vinyl acetate) or PVCA (poly vinyl chloride acetate) | 100 | |
| Graphite | 20 | 100 |
| Aluminum hydroxide | 15 | 60 |
| Ammonium phosphate | 3 | 29 |
| Swelling rate (%) | 300 | 1500 |

The flame retardant tube (40) comprises about 20 to about 100 parts by weight of graphite, about 15 to 60 parts by weight of aluminum hydroxide, and about 3 to 29 parts by weight of ammonium phosphate, based on 100 parts by weight of a base resin made of EVA (ethylene vinyl acetate) or PVCA (poly vinyl chloride acetate). The swelling rate measured for the part by weight of each of the functional additives was 300% to 1500%.

For the base resin used in the flame retardant tube (40), each or a mixture of EVA and PVCA can be used. According to one embodiment, the flame retardant tube (40) was prepared by mixing the base resin and the functional additives and forming the tube shape through an extrusion process (extrusion temperature: approximately 150° C.). However, the preparation method is not limited to extrusion. The diameter and thickness of the flame retardant tube (40) may be diversely prepared according to shape and size of a wire, a cable, and a pipe, etc., to be inserted into the tube.

In order to measure a free swelling rate of the flame retardant foam and the flame retardant tube, a coin-shaped specimen (diameter: 18 mm; thickness: 3.5 mm) was prepared and put into a furnace. After the specimen in the furnace maintained at 200° C. for three minutes, the swelling rate was measured. As a result, it was confirmed that the flame retardant foam and the flame retardant tube swelled 150% to 300% and 300% to 1500%, respectively.

The flame blocking mechanism according to the physical properties of the elements used in the present invention will be described. First, when fire occurs and, thereby, generates flames and rapidly increasing the ambient temperature, the flame retardant foam (30) and the flame retardant tube (40) swell. Consequently, the space in the open hole (20) is filled with pressure as much as the swelled volume. As a result, flames and gas generated from fire are blocked so as to not move through a partition wall.

Even if the sheath, etc., of a cable, a wire, and a pipe, etc., fuses due to high heat generated from fire, the flame retardant foam (30) and, even more so, the flame retardant tube (40)

passing through the through hole (45), swell due to the rapidly increasing temperature, thereby filling the volume space, i.e., the fused sheath of the wire, etc., in the flame retardant tube (40). As a result, flame and toxic gas are effectively blocked so as to not move through the open hole (20).

The construction method of the flame-blocking system according to the present invention will now be described. First, the flame retardant foam (30) is prepared. As described previously, the flame retardant foam (30) comprises a polyurethane foam resin as a base foam material, and further comprises graphite, aluminum hydroxide, and ammonium phosphate as functional additives contributing directly to swelling, endothermic reaction, and other firestopping properties.

The process for cutting the flame retardant foam (30) to a size suitable for the open hole (20) in a wall to be installed means a process for preparing and cutting the flame retardant foam (30) to a suitable size based on the shape and size of the open hole (20). Because the flame retardant foam (30) is compressible or resilient, it is desirable to cut the flame retardant foam (30) with a size a little larger than the space size of the open hole (20).

The process for making a hole in the flame retardant foam (30) to insert the flame retardant tube (40) means a process for forming a hole, i.e., the through hole (45), through which the flame retardant tube (40) passes, prior to inserting a cable (50), a wire, and a pipe, etc., into the flame retardant tube (40). The number of through hole(s) (45) in the flame retardant foam (30) may vary depending on the circumstances and for example, the number of cables (50) etc., present, and is not limited to any particular number.

The process for inserting the flame retardant tube (40) refers to a process for inserting the flame retardant tube into the through hole (45) in the flame retardant foam (30) after making a hole in the flame retardant foam (30). Installation may take place, for example, at the initial stage for constructing a building or ship. Alternatively, the construction and installation may be performed thereafter. For easy insertion and packing of an already installed wire, cable (50), and pipe, etc., the flame retardant foam (30) or the flame retardant tube (40) with one side cut off may be provided.

In addition, the construction method according to the present invention further comprises a process for inserting one of a cable (50), a wire, and a pipe into the flame retardant tube (40) and treating the surface with a silicone sealant.

Numerous substitutions, modifications, and variations to the present invention that has been described are possible by one of ordinary skill in the art of the present invention within the technical gist of the present invention. Thus, the scope of the present invention is not limited to the examples described herein and the appended drawings.

What is claimed is:

1. A flame-blocking system for fixing a pipe, wire or cable in an open hole formed in a partition wall, the flame-blocking system comprising:

an expandable flame retardant foam that expands in the presence of heat, the expandable flame retardant foam defining at least one through hole;

wherein the expandable flame retardant foam is configured to be sufficiently rigid to be cut to a size of an open hole formed in a partition wall, such that the least one through hole can be formed through a thickness of the expandable flame retardant foam; and at least one expandable flame retardant tube that expands in the presence of heat passing through the through hole of the expandable flame retardant foam;

wherein the expandable flame retardant tube is configured to be sufficiently rigid to insert into the through hole of the expandable flame retardant foam and to receive at least one of a pipe, wire and cable within an interior passageway of the expandable flame retardant tube;

and further wherein the expandable flame retardant foam and the expandable flame retardant tube each include graphite.

2. The flame-blocking system according to claim 1, wherein the expandable flame retardant foam comprises polyurethane foam and functional additives, and further wherein, based on 100 parts by weight of the polyurethane foam, an amount ratio of the functional additives equals 100 parts by weight comprising from about 20 to about 75 parts by weight of graphite, from about 14 to about 50 parts by weight of aluminum hydroxide, and from about 3 to about 25 parts by weight of ammonium phosphate.

3. The flame-blocking system according to claim 1, wherein the expandable flame retardant tube comprises a base resin made of PVCA (Poly Vinyl Chloride Acetate) or EVA (Ethylene Vinyl Acetate) and functional additives, and further wherein, based on 100 parts by weight of the base resin, an amount ratio of the functional additives equals 100 parts by weight comprising from about 20 to about 100 parts by weight of graphite, from about 15 to about 60 parts by weight of aluminum hydroxide, and from about 3 to about 29 parts by weight of ammonium phosphate.

4. The flame-blocking system according to claim 1, wherein the expandable flame retardant foam swells about 150 to about 300 volume % when exposed for 3 minutes or more to a temperature of 200° C. or more, and the expandable flame retardant tube swells about 300 to about 1500 volume % when exposed for 3 minutes or more to a temperature of 200° C. or more.

5. The flame-blocking system according to claim 1, wherein:

the expandable flame retardant foam comprises a polyurethane base foam, graphite, aluminum hydroxide, and ammonium phosphate; and the expandable flame retardant tube comprises a base resin selected from the group consisting of ethylene vinyl acetate and poly vinyl chloride acetate, graphite, aluminum hydroxide, and ammonium phosphate.

\* \* \* \* \*